(12) United States Patent
Latzina

(10) Patent No.: US 9,009,617 B2
(45) Date of Patent: Apr. 14, 2015

(54) DECISION AIDING USER INTERFACES

(75) Inventor: Markus Latzina, Walldorf (DE)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 12/845,588

(22) Filed: Jul. 28, 2010

(65) Prior Publication Data

US 2012/0030598 A1 Feb. 2, 2012

(51) Int. Cl.
*G06F 3/048* (2013.01)
*G06F 17/30* (2006.01)

(52) U.S. Cl.
CPC .............................. *G06F 17/30991* (2013.01)

(58) Field of Classification Search
USPC ........................... 715/212, 221, 227; 707/736
See application file for complete search history.

(56) References Cited

U.S. PATENT DOCUMENTS

| | | | |
|---|---|---|---|
| 7,010,779 B2 * | 3/2006 | Rubin et al. ................ | 717/106 |
| 7,397,464 B1 | 7/2008 | Robbins et al. | |
| 7,617,149 B2 * | 11/2009 | Rosenthal et al. ........... | 705/37 |
| 8,095,499 B2 * | 1/2012 | Thanu ......................... | 707/607 |
| 8,161,087 B2 | 4/2012 | Latzina | |
| 2003/0020707 A1 | 1/2003 | Kangas et al. | |
| 2004/0049732 A1 * | 3/2004 | Wicks ......................... | 715/509 |
| 2006/0078208 A1 * | 4/2006 | Malvar ........................ | 382/232 |
| 2007/0208992 A1 * | 9/2007 | Koren ......................... | 715/503 |
| 2008/0028287 A1 * | 1/2008 | Handsaker et al. ........... | 715/212 |
| 2008/0046803 A1 * | 2/2008 | Beauchamp et al. ......... | 715/212 |
| 2008/0109796 A1 | 5/2008 | Kosche | |
| 2009/0049372 A1 * | 2/2009 | Goldberg .................... | 715/227 |
| 2009/0083614 A1 * | 3/2009 | Wedekind ................... | 715/217 |
| 2009/0216808 A1 * | 8/2009 | Wallace ...................... | 707/104.1 |
| 2010/0169310 A1 | 7/2010 | Latzina | |
| 2010/0228752 A1 * | 9/2010 | Folting et al. ............... | 707/758 |
| 2011/0099465 A1 * | 4/2011 | Haberl ........................ | 715/217 |

OTHER PUBLICATIONS

Microsoft Excel 2007 User Manual.*
Baxley, Bob, "Universal model of a user interface", Designing for User Experiences, (2003), 1-14.
Feuerstack, Sebastian, et al., "Model-based Layout Generation", AVT'08, ACM 1-978-60558-141-5, (2008), 217-224.
"U.S. Appl. No. 12/346,383, Response filed Aug. 9, 2011 to Non Final Office Action mailed May 12, 2011", 13 pgs.
"U.S. Appl. No. 12/346,383, Non Final Office Action mailed May 12, 2011", 15 pgs.
"U.S. Appl. No. 12/346,383, Notice of Allowance Mailed Dec. 12, 2011", 9 pgs.

* cited by examiner

*Primary Examiner* — Andrea Leggett
*Assistant Examiner* — Hua Lu
(74) *Attorney, Agent, or Firm* — Schwegman Lundberg & Woessner, P.A.

(57) ABSTRACT

Various embodiments include at least one of a system, method, and software providing at least one user interface allowing a user to rapidly choose an optimal item, as represented by multi-attribute data objects, among a set of comparable items. One example method embodiment includes receiving a dataset having a plurality of data objects with a plurality of data object attributes. The method further includes generating a view of the data objects within a user interface on a display device. Such a view may include a representation of at least a subset of the plurality of data objects along a first axis with data objects positioned in proximity to a first pole of the first axis relative to importance of the data objects according to data object attribute criterion. The view may also include a representation of data object attributes including at least two designated as data object attribute criterion.

12 Claims, 6 Drawing Sheets

| | 10.2 MP TECH-IT | 13.1 MP TECH-IT | 11.3 MP REDBARY | 10.2 MP TECH-IT | 11.3 MP REDBARY |
|---|---|---|---|---|---|
| PRICE (RANK ↑) | $ 98.99 <u>212</u> | $ 99.00 | $ 110.50 | $ 120.00 | $ 120.00 |
| AVAILABILITY | 3 | 10 | 3 | 1 | 2 |
| COLOR (FLTR = RED) | RED | RED | RED | RED | RED |
| SUPPLIER | SPOT-ON | FLOOR-MART | HOME STATION | BEST PURCHASE | GREY MARK-IT |

SEARCH RESULTS FOR: 10+ MEGAPIXEL CAMERAS

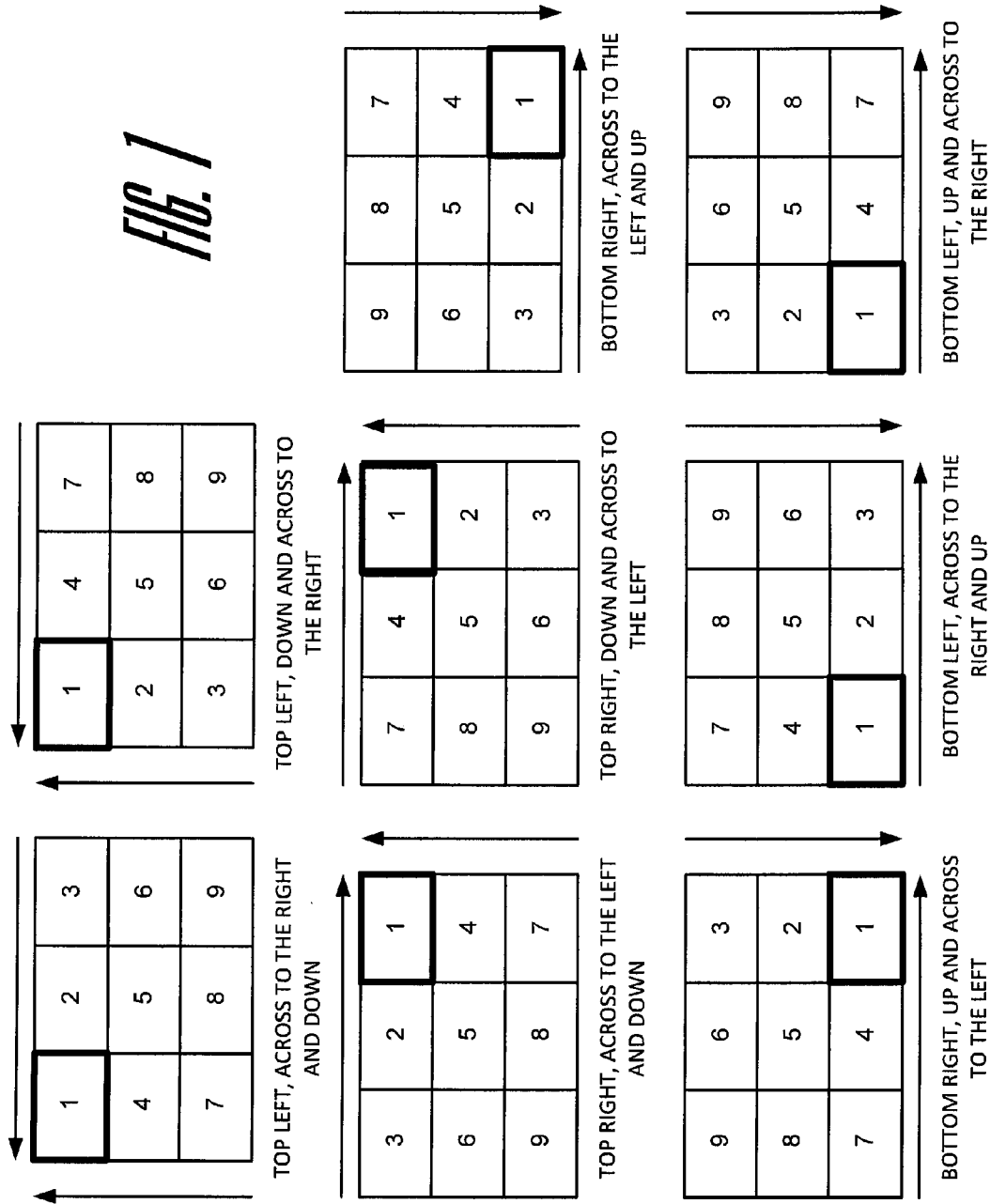

FIG. 2

SEARCH RESULTS FOR: 10+ MEGAPIXEL CAMERAS

|  | 10.2 MP TECH-IT | 13.1 MP TECH-IT | 11.3 MP REDBARY | 10.2 MP TECH-IT | 11.3 MP REDBARY |
|---|---|---|---|---|---|
| PRICE (RANK ↑) | $ 98.99 _212_ | $ 99.00 | $ 110.50 | $ 120.00 | $ 120.00 |
| AVAILABILITY | 3 | 10 | 3 | 1 | 2 |
| COLOR (FLTR = RED) | RED | RED | RED | RED | RED |
| SUPPLIER | SPOT-ON | FLOOR-MART | HOME STATION | BEST PURCHASE | GREY MARK-IT |

FIG. 3

SEARCH RESULTS FOR: 10+ MEGAPIXEL CAMERAS

|  | 10.2 MP TECH-IT | 11.3 MP REDBARY | 10.2 MP TECH-IT | 11.3 MP REDBARY | 13.1 MP TECH-IT |
|---|---|---|---|---|---|
| AVAILABILITY (RANK ↑) | 1 _212_ | 2 | 3 | 3 | 10 |
| PRICE | $ 120.00 | $ 120.00 | $ 98.99 | $ 110.50 | $ 99.00 |
| COLOR (FLTR = RED) | RED | RED | RED | RED | RED |
| SUPPLIER | BEST PURCHASE | GREY MARK-IT | SPOT-ON | HOME STATION | FLOOR-MART |

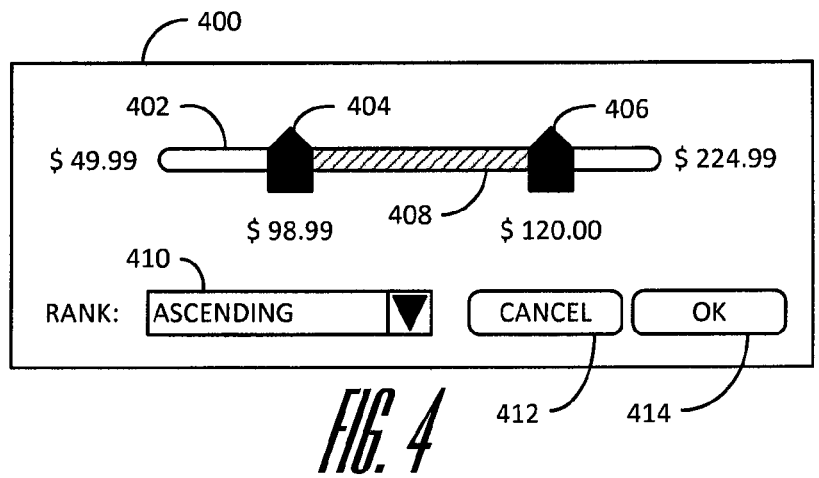

*FIG. 4*

```
502
USER INTERFACE CONFIGURATION

DATA OBJECTS
    AXIS [ X/Y ]
    PREFERENCE [WHEN X-AXIS, LEFT/RIGHT; WHEN Y-AXIS, TOP/BOTTOM]
ATTRIBUTES
    PREFERENCE [WHEN Y-AXIS, TOP/BOTTOM; WHEN X-AXIS, LEFT/RIGHT]
```

504

| ATTRIBUTE_PRECEDENCE_RANKING_FILTER | | | |
|---|---|---|---|
| ATTRIBUTE | PRECEDENCE | RANKING | FILTER |
| PRICE | 1 | ASCEND | <NULL!> |
| AVAILABILITY | 2 | <NULL!> | <NULL!> |
| COLOR | 3 | <NULL!> | COLOR=RED |
| SUPPLIER | 4 | <NULL!> | <NULL!> |

*FIG. 5*

DECISION AIDING USER INTERFACES

BACKGROUND INFORMATION

Common uses of information technology assets including searching for and displaying data objects representative of many different things. For example, data objects may represent items offered for sale, candidates for jobs, multiple assets capable of use for particular purposes, and the like. Common among such data objects is that the data objects have attributes. For example, items offered for sale may have attributes including a price, a color, a manufacturer, size dimensions, measures of other properties, and the like. Presentation of these data objects within user interfaces allows for sorting on only a single attribute, such as price in an ascending or descending order.

BRIEF DESCRIPTION OF THE DRAWINGS

FIG. 1 is an illustration of several data object and data object attribute precedent diagrams, according to example embodiments.

FIG. 2 is a user interface illustration, according to an example embodiment.

FIG. 3 is a user interface illustration, according to an example embodiment.

FIG. 4 is a user interface illustration, according to an example embodiment.

FIG. 5 illustrates user interface configuration data structures, according to an example embodiment.

DETAILED DESCRIPTION

Figure 6:
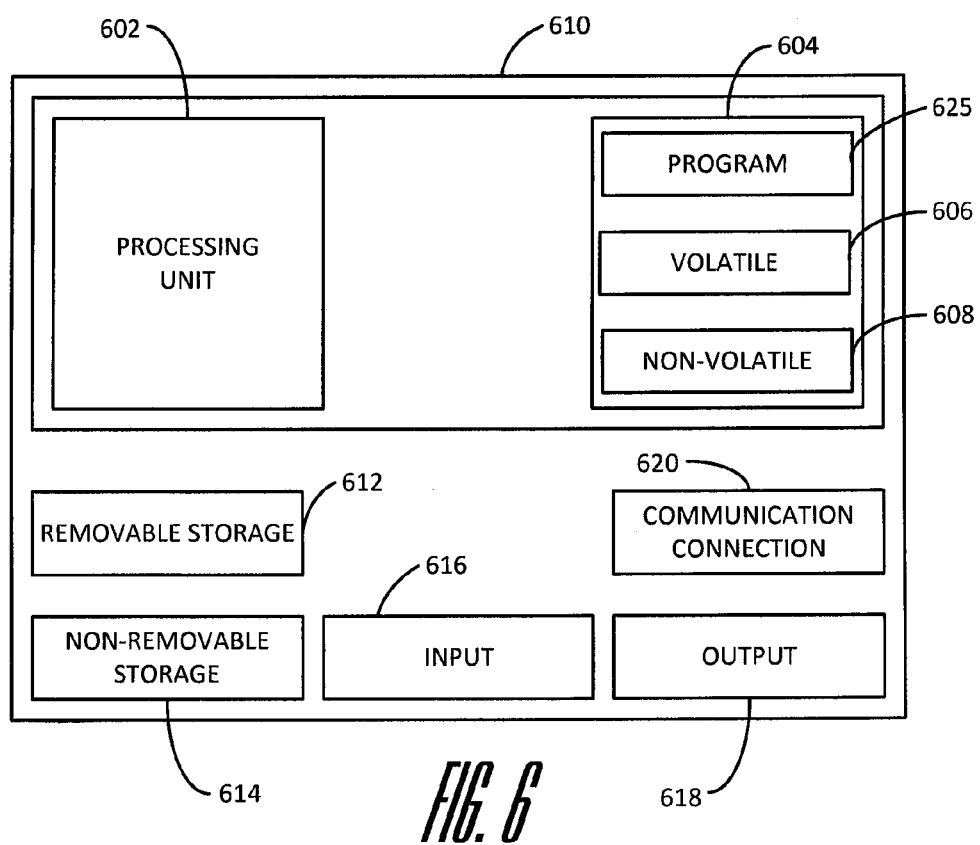
FIG. 6 is a block diagram of a computing device, according to an example embodiment.

Various embodiments include at least one of a system, a method, and a tangible computer-readable medium with executable instructions stored thereon providing at least one user interface allowing a user to rapidly choose an optimal item, as represented by multi-attribute data objects, among a set of comparable items. Some such embodiments enable a user to select an item from a set of items with respect to the user's preferences. The user's preferences may be provided through input into a user interface and the results rapidly provided in the same user interface. Some embodiments involve a combination of spatial arrangements and user interface implements for graphical positioning techniques tightly connected to the goal of aiding the user in identifying an optimal item.

Within user interfaces, there are prime areas where users first look, or consider to be a starting point, when assessing displayed information. Prime areas may be based on the cultural backgrounds of users, language rules, and other norms. The prime area may be a specific area or a general area. Between two users, the location of the prime area may be different. However, each user has a prime area, such as a top-left position within a user interface, which may correspond to a common starting point for reading in English, Spanish, German, and French text. By leveraging the location of a prime area within a user interface, an intuitive decision aid is provided to users.

Amongst a plurality of multi-attribute data objects that represent items, certain attributes contribute to the optimality of an item. Certain attributes may be more important than others, while other attributes may not have any importance. Further, in some instances, a range of attribute values may be equally relevant. Thus, various embodiments provide mechanisms allowing users to designate data object attributes and precedence among the designated data object attributes. Some embodiments may also include mechanisms allowing users to designate schemes for ranking and filtering data object attribute values. Although ranking may include sorting, ranking is generally a purpose for arranging data object attribute values in an order which reflects a likely user preference. The designated data object attributes, attribute precedence, and attribute value ranking and filtering combine to form data object attribute criterion. The user interface then applies the data object attribute criterion to move the data objects, and attributes thereof, in proximity with the prime area of the user interface relative to a level of compliance with the data object attribute criterion. Relative compliance with the data object attribute criterion is typically indicative of a likely user preference of an item represented by a data object over other items represented by respective data objects. User preferences, as referred to herein, may be in accordance with input received from a user, previous user input retrieved from storage, a default setting, a predicted setting, a configuration stored in executable code, or other data of actual, predicted, or default user preferences. These and other embodiments are described below with reference to the accompanying illustrations.

In the following detailed description, reference is made to the accompanying drawings that form a part hereof, and in which are shown, by way of illustration, specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. The following description is, therefore, not to be taken in a limiting sense, and the scope of the inventive subject matter is defined by the appended claims.

The functions or algorithms described herein are implemented in hardware, software or a combination of software and hardware in one embodiment. The software comprises computer executable instructions stored on a tangible computer readable medium, such as memory or other type of data storage devices. Further, described functions may correspond to modules, which may be software, hardware, firmware, or any combination thereof. Multiple functions are performed in one or more modules as desired, and the embodiments described are merely examples. The software is executed, at least in part, on one or more of at least one computer processor, digital signal processor, Application Specific Integrated Circuit (ASIC), microprocessor, or other type of processor operating on a system, such as a personal computer (PC), set top box, personal digital assistant (PDA), smart phone, server, router, or other device capable of processing data, including network interconnection devices.

FIG. 1 is an illustration of several data object and data object attribute precedence diagrams, according to example embodiments. As briefly discussed above, within user interfaces, there are prime areas where users first look, or consider to be a starting point, when assessing displayed information. The prime area may vary based on the particular embodiment or on configuration settings. Further, an order of precedence of areas within the user interface may also vary depending on the embodiment or configuration settings. Each of the illustrations of FIG. 1 shows an example of a prime area (identified by the number "1") and the precedence of the other areas in relation to the prime area. The arrows of each illustration point in a direction of the prime area. The text of each illustration describes where the prime area is located and how to progress away from the prime area. As will be readily apparent, the order of precedence of the various areas may be selected or specified in accordance with a language of a user and the manner in which text of that language is read. For example, in English text is read from an upper left most position, progressing horizontally to the right and then down. In view of such user interface area precedence locations, some embodiments operate to align display locations of data object representations with user interface area precedence locations according to compliance with the data object attribute criterion as may be specified by default or by a user. Such embodiments provide a decision aid to users in selecting an optimal item represented by a data object amongst a set of available items.

FIG. 2 and FIG. 3 are user interface 200 illustrations, according to example embodiments. Beginning with FIG. 2, the user interface 200 provides a view of multi-attribute data object representations. In particular, along the top row 204, or X-axis, identifiers of data objects are provided. In this example embodiment, the data objects are data representative of digital cameras offered for sale on a merchandising website or on a product selection kiosk within a store. Along the left most column 206, or Y-axis, data object attributes are provided. The attributes are attributes included within the data objects of the digital cameras offered for sale. These attributes include price, availability as a number of days, color, and supplier. Additional attributes may also be included. The attribute values of the particular data objects are represented within the illustrated two-dimensional array 202 where the attributes intersect with the particular data objects.

The two-dimensional array 202 of the user interface 200 includes a prime area determined at the top and left area where a data object and attribute intersect 212. This is the location where the most highly rated attribute intersects with a data object most likely to be considered optimal by the user. The optimal data object is determined, or predicted, based on data object attribute criterion. The data object attribute criterion includes an order of precedence of one or more data object attributes, such as price, availability, and color, as illustrated within the user interface 200. These one or more data object attributes and their precedence (i.e., price=1, availability=2, color=3) may each be further augmented with one or more rules for ranking and filtering attribute values of the various data objects. An example ranking rule may be provided to cause data objects to be sorted by a particular attribute, such as price sorted in an ascending order, as illustrated in FIG. 2. An example filtering rule may be provided to eliminate or hide data objects from the two-dimensional array 202, such as filtering on the color red so only red digital cameras are displayed. Other ranking and filtering rules may be utilized in various embodiments. For example, within a set of data objects, some of the data objects may include an image attribute while other data objects do not. A ranking rule may evaluate the image data object attribute in a Boolean manner and data objects may be ranked according to the presence of an image within the image data object attribute according to a default or user supplied preference. Further, a filtering rule may not only eliminate certain data objects according to a filtering rule that contemplates one or more data object attributes, a filter rule may also combine two or more data object attributes within a user interface, such as the two-dimensional array 202 to indicate compliance with the filter rule. For example, a filtering rule may require a data object attribute be less than a threshold amount The two dimensional array in such an embodiment may reflect compliance with this filtering rule, for example by indicating "<200" when the threshold value is 200.

Taking into account the data object attribute criterion, including the precedence of the attributes (price=1, availability=2, color=3), the sorting based on price in an ascending order, and the filtering on the color red, the display of the data objects is modified, such as by reordering the data objects. The reordering is applied based on the sorting on price in ascending order which moves the 10.2 MP TECH-IT digital camera from supplier SPOT-ON to the left most (most important) position. Further, the color filter of RED-only is applied, thereby removing data objects of any non-red digital cameras from the two-dimensional array 202. The user may then view the data objects and attributes thereof and quickly view the attributes deemed most important, as may be configured by the user, by default, or as suggested by a developer of the user interface based on data the data objects represent. In the illustrated instance, a user is able to quickly view the price, availability, and color attributes that the user deems most important with the data objects sorted according to a location and arrangement of the prime areas (i.e., top left).

In some embodiments, the prime area may identified with the user interface 200, such as by highlighting, coloring, flashing, or other visual indicia. In instances where an embodiment is applied to a screen reading purpose, such as for use by visually impaired users, an audio indicia may be provided for the prime area. In some embodiments, a user may include non-ranking criterion, such as filters at a pole of the attribute axis, such as Y-axis 206. In such a case, the top-left most position (assuming a top-left prime area) is not the prime area. Instead, the prime area is on the left side at the top-most position of a data object attribute including a ranking rule.

Additionally, filtering rules may be added with regard to one or more data object attributes. As more filtering rules are applied, or at least a more restrictive filtering rule is applied, the remaining data object displayed within the two-dimensional array 202 of the user interface 200 will decrease. In an instance where there is only a single data object remaining after application of one or more filtering rules, the remaining data object is the optimal result.

In some embodiments, an indicia may also be provided within the user interface 200 with regard to data object attributes displayed within the two-dimensional array 202 indicating that one or both of a sorting rule and a filtering rule would not be useful. For example, if all values of a particular attribute of all the data objects are identical, sorting and ranking on that attribute would not assist a user in identifying an optimal data object.

After viewing the results in FIG. 2, the user may decide another attribute is more important than price. In such an instance, the user may rearrange the attributes in the left most column 206 to move the availability attribute to the most prominent position and price to the next most prominent position. Further, an additional attribute may be moved into the criterion that was not previously included. The attributes may be rearranged and added and removed from the criterion in some embodiments using a drag-and-drop action executed through use of a pointing input device of a computer, such as a mouse. The user may then also designate a sorting rule for availability and remove the sorting rule for price. FIG. 3 illustrates the result of such an action.

Continuing with FIG. 3, the data objects for the respective digital cameras have been reordered. In particular, the data object of the 10.2 MP TECH-IT digital camera available from supplier BEST PURCHASE is moved to the left most (most important) position due to its quickest availability period of one day. Other changes may be made to the attributes included in the criterion, the ordering of the attributes within the criterion, and sorting and filtering rules may be added, removed, or modified. For example, a user may create or modify a sorting or filtering rule through use of a user interface such as is illustrated in FIG. 4.

FIG. 4 is a user interface 400 illustration, according to an example embodiment. The user interface 400 is an example of a user interface that may be utilized to create and modify sorting and filtering rules associated with a data object attribute within a data object attribute criterion.

The user interface 400 includes a range bar 402 for use in generating a filtering rule that represents a range of data object attribute values present in a data object set, such as the data objects present within the user interface 200 of FIG. 2 and FIG. 3. The range bar 402 may include a pair of sliders 404, 406 that may be used to set a low and a high value for a range of values 408. In some embodiments, the sliders 404, 406 may also be used to set only minimum value or maximum value, or even a range of values to be excluded. However, a filtering rule need not be generated. Further, in other embodiments where the data object attribute to which a rule is to be associated does not include numerical or date values, other controls and data representations may be utilized. The user interface 400 also includes a drop-down list box 410 that may be used to set a sorting direction of a sorting rule. In some embodiments, the sorting rule may be adaptive to the type of data present with regard to data object attributes. For example, when a particular data object attribute is not present in all of a set of data objects, the drop-down list box 410 may allow sorting based on the presence of the data object attribute. Other sorting options may be available based on the type of data of a particular data object attribute and the needs and purposes of the particular embodiment.

In other embodiments, filter rules may be generated on non-numerical values. For example, in FIG. 2 and FIG. 3, a filtering rule is based on color. In such instances, a user may be provided with a user interface listing a universe of data object attribute values for the attribute COLOR. For example, a user may be provided a listing of red, maroon, pink, magenta, red-violet, ruby red, blue, green, black, white, and any number of other colors. From this presented list, a user may select a number of these colors to include or exclude with the filter and also be given the opportunity to name the filter. For example, the user may select the colors red, maroon, pink, magenta, red-violet, ruby red from the listing and give the filter the name RED. The filter will then be applied to include only the selected colors. The user interface may then modify how the actual data object attribute is displayed within the user interface 200, such as by indicating the filter name or other data value within the two-dimensional array 202 for the data object attribute COLOR.

Upon creation of at least one of a filtering rule and a sorting rule, an OK control button 414 may be selected and the rules are populated back into the user interface from which the user interface 400 was opened. For example, a user may select the price attribute in the user interface 200 of FIG. 2 and FIG. 3, and the user interface 400 of FIG. 4 is displayed. Once the user is finished manipulating the user interface 400 and selects the OK control button 414, the user interface 400 is closed and the user interface 200 of FIG. 2 and FIG. 3 is modified to reflect the changes made. A cancel control button 412 may alternatively be selected to discard any changes made within the user interface 400 of FIG. 4.

As changes are made to the data object attribute criterion, the changes, in some embodiments, are reflected in one or more data structures from which user interfaces may be modified. Such data structures may also be stored as default values and even associated with different data object types for use when a user interface as described herein is used with data objects, including data representative of different things. For example, the user interface 200 of FIG. 2 and FIG. 3 may be used not only as a decision aid for the selection of a digital camera, but also for use as a decision aid with regard to other products such as automobiles and paper products, as well as cooking recipes, job applicants, and other things that may be represented as multi-attribute data objects. Examples of two data structures that hold data object attribute criterion are illustrated in FIG. 5.

FIG. 5 illustrates user interface configuration data structures 502, 504, according to an example embodiment. As illustrated, the data object attribute criterion is stored in two data structures 502, 504. A first data structure 502 stores user interface configuration data. The user interface configuration data designates a location of the prime area. In particular, the first data structure designates an axis of a two-dimensional display area where the data objects will be displayed, such as the horizontal x-axis 204 illustrated in FIG. 2 and FIG. 3. Next, the first data structure 502 includes user preference data indicating which pole of the designated axis indicates a user preference, such as the left or right poles of the horizontal x-axis or the top or bottom of the y-axis. Next, the first data structure 502 designates a user preference pole of the remaining axis of the two-dimensional display area for display of data object attributes. For example, assuming the first data structure designates the x-axis for display of data objects, the y-axis is inferred for display of the data object attributes. In such embodiments, the user preference for display of the data object attributes on the y-axis may ensure that user preferred data object attributes are displayed at the top or bottom poles.

The second data structure 504 illustrated in FIG. 5 includes data defining data object attribute criterion. Such data typically includes data object attributes designated for inclusion in the data object attribute criterion, an order of precedence of the data object attributes, and optional ranking and filtering rules for each of the data object attributes. The precedence data may be a number designating an order of the data object attributes for placement on the attributes axis in proximity to the user preference pole of the attributes axis. For example, as illustrated in the second data structure 504, the price attribute will be placed on the data object attributes axis in closest proximity to the data object attributes user preference pole as designated in the first data structure 502.

In some embodiments, the user interface configuration data contained in the first data structure 502 may instead be included within the code of a computer application providing a decision aiding user interface, such as user interface 200 of FIG. 2 and FIG. 3. In other embodiments, the user interface configuration data contained in the first data structure 502 may be included in application settings provided by a system administrator or as provided by a default installation of a computer application.

The attribute, precedence, ranking, and filter data of the second data structure 504 may be stored in one data structure as illustrated in FIG. 5. However, in other embodiments, the data may be stored in one or more database tables and be retrievable from a computer memory device or over a network from a relational database management system. In other embodiments, the data may be encoded in an instruction set of a computer application providing a decision aiding user interface, such as user interface 200 of FIG. 2 and FIG. 3.

In further embodiments, the data of one or both data structures 502 and 504 may be retrieved from a database along with data objects, including attributes. In such instances, the database from which the data objects are retrieved may include metadata providing information for initially displaying data objects and data object attributes within a user interface. In some embodiments, when a user modifies data object attribute precedence and ranking and filtering rules, data representative of the changes may be stored back to the database, or other data source, from which the data objects were retrieved.

In some further embodiments, the attribute, precedence, ranking, and filter data of the second data structure 504 may be associated with a particular type of data object, such as data objects representative of certain types of products (e.g., digital cameras). In other embodiments, the attribute, precedence, ranking, and filter data of the second data structure 504 may be associated with a stored query, such as a query of a human resources database for data objects representative of applicants for a particular job. Thus, when a user retrieves data objects, the query results may also include attribute, precedence, ranking, and filter data, such as the data in the second data structure 504, for use in displaying the results.

In additional embodiments, a single data structure may include a representation of multi-attribute data objects, instructions for generating a user interface for displaying the multi-attribute data objects, and user interface configuration data, such as illustrated in FIG. 5. For example, the single data structure in such embodiments may be a document file with the multi-attribute data objects, user interface instructions, and user interface configuration data embedded therein. Such a document may be read by a computer application which will generate a view of the multi-attribute data objects, such as the view provided in the user interface 200 of FIG. 2 and FIG. 3, within an application window of the reading computer application.

The various embodiments illustrated and described herein operate, at least in part, on client computing devices such as personal and laptop computers, PDAs, smart phones, and other computing devices. An example of such a computing device is illustrated in FIG. 6.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device, in the form of a computer 610, may include at least one processing unit 602, at least one memory 604 device, removable storage 612, and non-removable storage 614. Memory 604 may include volatile memory 606 and non-volatile memory 608. Computer 610 may include (or have access to a computing environment that includes) a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The input 616 may include one or more of a keyboard, a pointing device, a microphone, a camera, and the like. The output 618 may include a display device such as a monitor, a speaker, and the like.

Computer-readable instructions stored on a computer-readable medium are executable by the at least one processing unit 602 of the computer 610. A hard drive, CD-ROM, and RAM are some examples of articles including a computer-readable medium. For example, computer program 625 may be executable to perform one or more of the methods or to provide one or more of the user interfaces illustrated and described herein.

The computer 610 may operate in a networked environment using a communication connection to connect to one or more remote computers, such as database servers. The remote computer may include a PC, server, router, network PC, a peer device or other common network node, or the like. The communication connection may include a Local Area Network (LAN), a Wide Area Network (WAN), the Internet, or other networks. An example of such a networked computing environment is illustrated in FIG. 7.

Figure 7:
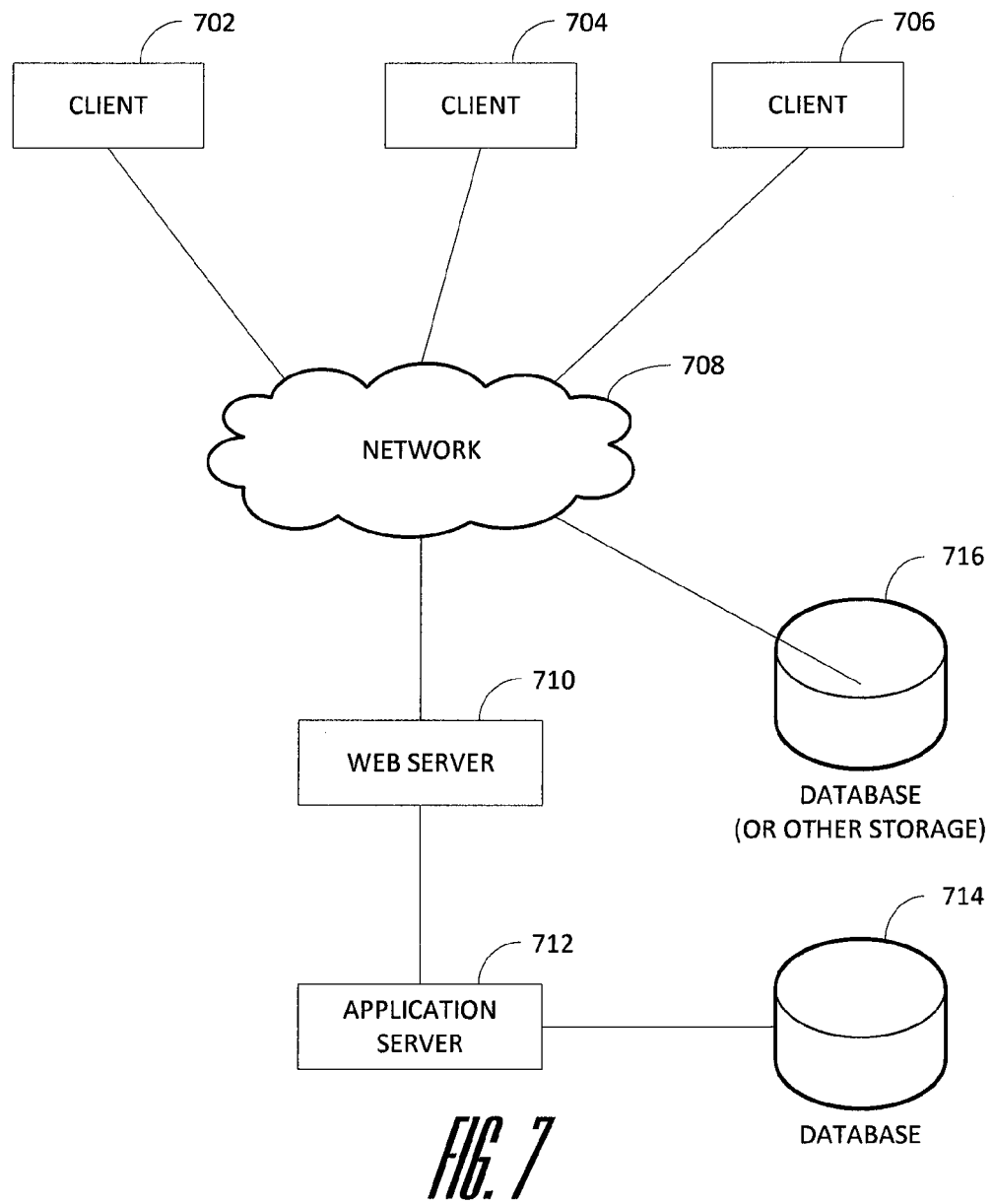
FIG. 7 is a block diagram of a computing environment, according to an example embodiment.

FIG. 7 is a block diagram of a computing environment, according to an example embodiment. The computing environment includes client computing devices 702, 704, 706 connected to a network 708. Also connected to the network are a web server 710 and a database 716 (or other data storage). Connected to the web server 710 are an application server 712 and a database 714.

In some embodiments, the client computing devices 702, 704, 706 may take the form of the computer 610 of FIG. 6. However, the computing devices 702, 704, 706 may be of differing types and forms, such that computing device 702 may be a smart phone, computing device 704 may be a PC, and computing device 706 may be television set top box. Further, although only three client computing devices 702, 704, 706 are illustrated within the computing environment, a smaller number or a larger computer of client computing devices may be present in various embodiments.

The network 708 within the computing environment is representative of one or more computer networks. For example, the network 708 may include one or more of a LAN, a WAN, the Internet, a virtual private network (VPN), a wireless telephone network, and other networks. Connections to the network may be wired or wireless connections.

The database 716, or other data storage, is representative of a data storage location from which multi-attribute data objects may be retrieved. Similarly, multi-attribute data objects may be retrieved from the web server 710. In some embodiments, a client computing device 702, 704, 706 may submit a query over the network 708 for multi-attribute data objects. The query may be directed to the database 716 or the web server 710. Upon receipt of the query, the database 716 may process the query to obtain query results and return the query results over the network 708 to the requesting client. The web server 710, upon receipt of the query, may forward the query to the application server 712. The application server 712 may execute code as needed or referenced by the query to process the query. For example, the application server 712 may be a JAVA compliant application server that provides services over the network 708 via servlets. While processing the query, the application server 712 may retrieve data from the database 714, assemble that data in the form of multi-attribute data objects, and return the data to the requesting client over the network 708 via the web server 710.

The computer 610 of FIG. 6 and the computing environment of FIG. 7 may also be utilized in other ways. For example, the computer 610 of FIG. 6 and computing environment of FIG. 7 may be utilized, individually or in combination, to perform one or more of the methods described herein, such as the methods 800 and 900 of FIG. 8 and FIG. 9, respectively.

Figure 8:
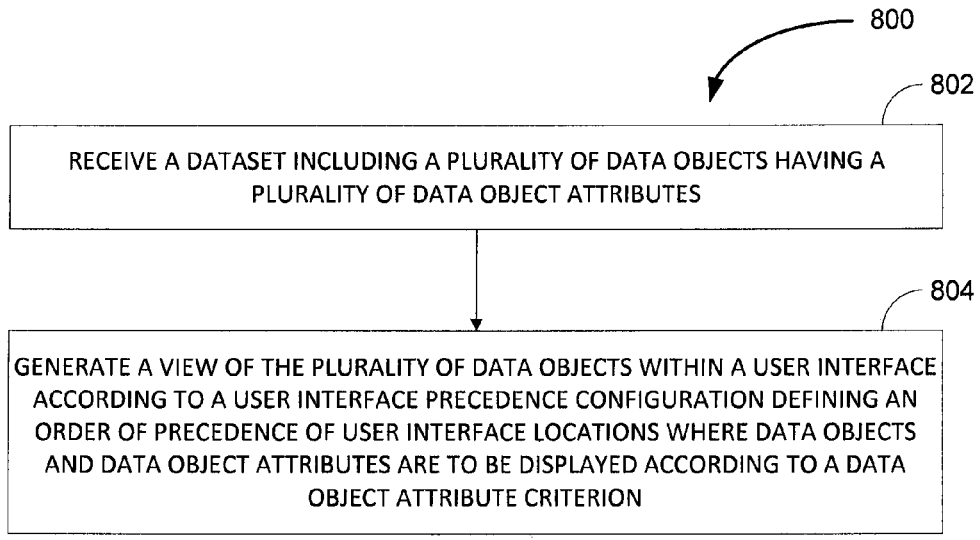
FIG. 8 is a flow diagram of a method, according to an example embodiment.

FIG. 8 is a flow diagram of a method 800, according to an example embodiment. The method 800 is an example of a method that may be performed to generate a decision aiding user interface. The method 800 includes receiving 802 a dataset that includes a plurality of data objects having a plurality of data object attributes. Receiving 802 the dataset may include retrieving the data objects from a file, from a database over a network, or other data storage location.

The method 800 further includes generating 804 a view of the plurality of data objects within a user interface, such as on a display device. The view may be generated 804 according to a user interface precedence configuration defining an order of precedence of user interface locations where data objects and data object attributes are to be displayed according to a data object attribute criterion.

In some example embodiments, the data object attribute criterion consumed by the method 800 includes data identifying one or more data object attributes and data defining a precedence for at least one of the one or more identified attributes in ranking the plurality of data objects. In some embodiments, the data object attribute criterion data identifying one or more data object attributes identifies at least two data object attributes. In some embodiments, the data object attribute criterion may also include at least one of a ranking rule and a filter rule. A ranking rule in such embodiments may be associated with at least one of the one or more identified data object attributes for ranking the plurality of data objects. A filtering rule in such embodiments may be associated with at least one of the one or more identified data object attributes. Application of such a filtering rule may remove data objects from view within the user interface when a value of the at least one of the one or more identified data object attributes is excluded by the filtering rule.

In another method embodiment for generating a decision aiding user interface, the method may be performed on a client computing device. The method in such embodiments may include receiving a dataset having a plurality of data objects with a plurality of data object attributes. The method includes generating a view of the plurality of data objects within a user interface on a display device. The view may include a representation of at least a subset of the plurality of data objects along a first axis with data objects positioned in proximity to a first pole of the first axis relative to importance of the data objects according to data object attribute criterion. The view may also include a representation of a subset of the plurality of data object attributes. The representation of the subset of the plurality of data object attributes may include one or more data object attributes designated as data object attribute criterion. In some embodiments, the data object attribute criterion may include at least two data object attributes. The subset of the plurality of data object attributes are then positioned along a second axis in proximity to a first pole of the second axis according to data object attribute configuration settings.

The data object attribute criterion, as mentioned above, may be formed from the designation of the subset of data object attributes as data object attribute criterion, the proximity of each of the subset of object attributes positioned in proximity to the first pole of the first axis, and the data object attribute configuration settings. In some embodiments of this method, the first pole of the first axis and the first pole of the second axis are identified in a precedence configuration setting consumed by the user interface. The data object attribute criterion may further include data designating a position of each of the subset of the plurality of data object attributes relative to a position from the first pole of the second axis.

In some embodiments, the data object attribute configuration settings of the data object attribute criterion may include a ranking rule associated with at least one of the subset of the data object attributes. Application of such a ranking rule will affect a data object importance determination by identifying, at least in part, a position of respective data objects in proximity to the first pole of the first axis. Some such embodiments may further include a filtering rule associated with at least one of the subset of data object attributes. Application of such a filtering rule typically removes data objects from view within the user interface when a value of the at least one of the subset of data object attributes is excluded by the filtering rule.

Figure 9:
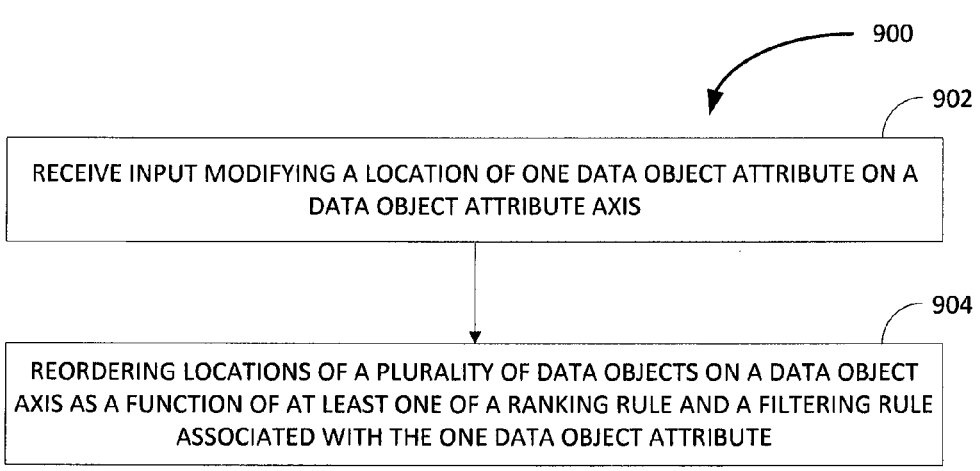
FIG. 9 is a flow diagram of a method, according to an example embodiment.

FIG. 9 is a flow diagram of a method 900, according to an example embodiment. The method 900 is an example embodiment of a method of receiving input changing a precedence of an attribute of a multi-attribute data object presented within a user interface. The method includes receiving 902 input modifying a location of a data object attribute on a data object attribute axis. For example, and with reference to FIG. 2, input may be received within the user interface 200 modifying a position of the availability attribute on the y-axis to be in the top position. This change is illustrated in FIG. 3.

The method 900 further includes reordering 904 locations of a plurality of data objects on a data object axis as a function of at least one of a ranking rule and a filtering rule associated with the one data object attribute. Again with reference to FIG. 2 and FIG. 3, once the availability attribute is moved to the top of the attribute precedence on the data object attribute axis 206, the data objects on the data object axis 204 are reordered according to the ranking rule associated with the availability attribute. Thus, the top attribute value of the top data object is moved to the top, left-most position to aid the user in quickly identifying the data object and attribute combination deemed most important according to the data object attribute criterion.

Another example embodiment takes the form of a system, such as computer 610 of FIG. 6. The system in such embodiments includes at least one processor, at least one memory device, a display device, one or more input devices, and a network interface device coupled to a bus. An instruction set is typically stored in the memory device and executable by the at least one processor to perform various tasks. Such tasks may include receiving, via the one or more input devices, selection input for the selection of data objects from a remote location such as a remote database, a website, or other location. The tasks may further include forming and submitting a data query over a network via the network interface device for data objects based on the selection input. Subsequent tasks may include receiving from the remote location via the network interface device, a dataset including a plurality of data objects, each having a plurality of data object attributes. An additional task may include generating a view, on the display device, of the plurality of data objects within a user interface. The view may include a presentation of a subset of the plurality of data objects along a first axis with data objects positioned in proximity to a first pole of the first axis relative to a ranking of the data objects according to data object attribute criterion. The view may also include a representation of at least a subset of the plurality of data object attributes along a second axis. The data object attributes may be positioned in proximity to a first pole of the second axis relative to a ranking of the data object attributes according to data object attribute configuration settings. In some embodiments, the data object attribute criterion include data representative of the position of data object attributes in proximity to the first pole of the first axis and the data object attribute configuration settings.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving a dataset including a plurality of data objects having a plurality of data object attributes;
   selecting a stored data object attribute criterion based on a type of the data objects of the received dataset, the stored data object attribute criterion including:
      data identifying a subset of the plurality of data object attributes to be presented on a second axis;
      data defining an order of precedence for the subset of the plurality of data object attributes when presented on the second axis;
      at least one data object ranking rule that ranks data objects for a ranked presentation on a first axis, the ranking performed according to values of at least one of the identified data object attributes included in the at least one data object ranking rule;
   generating a view of the plurality of data objects within a user interface on a display device, the view including:
      a representation of at least a subset of the plurality of data objects along a first axis with data objects positioned in proximity to a first pole of the first axis based on a ranking of the data objects performed according to the at least one data object ranking rule of the data object attribute criterion;
      a representation of the subset of the plurality of data object attributes presented in an order along the second axis in proximity to a first pole of the second axis according to the data identifying the subset of and the data identifying the order of precedence for the data object attributes of the data object attribute criterion; and
   wherein:
      the first pole of the first axis and the first pole of the second axis are identified in a precedence configuration setting consumed by the user interface; and
      the selected data object attribute criterion and the precedence configuration setting are stored in at least one data structure independent of data of the plurality of data objects.

2. The method of claim 1, further comprising:
   receiving, within the user interface, input modifying a location of a data object attribute on the second axis to a first location in proximity to the first pole on the second axis; and
   reordering locations of the plurality of data objects along the first axis.

3. The method of claim 1, wherein the data object attribute configuration settings of the data object attribute criterion include:
   a filtering rule associated with at least one of the subset of data object attributes, with application of the filtering rule removing data objects from view within the user interface based on a value of the at least one of the subset of data object attributes is excluded by the filtering rule.

4. The method of claim 3, further comprising:
   receiving, within the user interface, input modifying a location of one data object attribute of the subset of data object attributes on the second axis to a first location in proximity to the first pole on the second axis; and
   reordering locations of the plurality of data objects along the first axis as a function of at least one of a ranking rule and filtering rule associated with the one data object attribute.

5. A non-transitory computer-readable medium, with instructions stored thereon executable by at least one computer processor to cause a computer to perform a method comprising:
   receiving a dataset including a plurality of data objects having a plurality of data object attributes;
   select a stored data object attribute criterion based on a type of the data objects of the received dataset, the stored data object attribute criterion including:
      data identifying a subset of the plurality of data object attributes to be presented on a second axis;
      data defining an order of precedence for the subset of the plurality of data object attributes when presented on the second axis;
   at least one data object ranking rule that ranks data objects for a ranked presentation on a first axis, the ranking performed according to values of at least one of the identified data object attributes included in the at least one data object ranking rule;
   generating a view of the plurality of data objects within a user interface on a display device, the view including:
      a representation of at least a subset of the plurality of data objects along a first axis with data objects positioned in proximity to a first pole of the first axis based on a ranking of the data objects performed according to the at least one data object ranking rule of the data object attribute criterion;
      a representation of the subset of the plurality of data object attributes presented in an order along the second axis in proximity to a first pole of the second axis according to the data identifying the subset of and the data identifying the order of precedence for the data object attributes of the data object attribute criterion; and
   wherein:
      the first pole of the first axis and the first pole of the second axis are identified in a precedence configuration setting consumed by the user interface; and
      the selected data object attribute criterion and the precedence configuration setting are stored in at least one data structure independent of data of the plurality of data objects.

6. The non-transitory computer-readable medium of claim 5, further comprising:
   receiving, within the user interface, input modifying a location of a data object attribute on the second axis to a first location in proximity to the first pole on the second axis; and
   reordering locations of the plurality of data objects along the first axis.

7. The non-transitory computer-readable medium of claim 5, the data object attribute configuration settings of the data object attribute criterion including:
   a filtering rule associated with at least one of the at least two data object attributes, with application of the filtering rule removing data objects from view within the user interface based on a value of the at least one of the at least two data object attributes is excluded by the filtering rule.

8. The non-transitory computer-readable medium of claim 7, further comprising:
receiving, within the user interface, input modifying a location of one data object attribute on the second axis to a first location in proximity to the first pole on the second axis; and
reordering locations of the plurality of data objects along the first axis as a function of at least one of a ranking rule and filtering rule associated with the one data object attribute.

9. A system comprising:
a processor, a memory device, a display device, one or more input devices, and a network interface device coupled to a bus;
an instruction set stored in the memory device and executable by the processor to:
receive, via the one or more input devices, selection input for selection of data objects from a remote location;
form and submit a data query over a network via the network interface device for data objects based on the selection input;
receive via the network interface device from the remote location, a dataset including a plurality of data objects each having a plurality of data object attributes;
select a stored data object attribute criterion based on a type of the data objects of the received dataset, the stored data object attribute criterion including:
data identifying a subset of the plurality of data object attributes to be presented on a second axis;
data defining an order of precedence for the subset of the plurality of data object attributes when presented on the second axis;
at least one data object ranking rule that ranks data objects for a ranked presentation on a first axis, the ranking performed according to values of at least one of the identified data object attributes included in the at least one data object ranking rule;
generate a view, on the display device, of the plurality of data objects within a user interface, the view including:
a subset of the plurality of data objects along a first axis with data objects positioned in proximity to a first pole of the first axis based on a ranking of the data objects performed according to the at least one data object ranking rule of the data object attribute criterion;
a representation of the subset of the plurality of data object attributes presented in an order along the second axis in proximity to a first pole of the second axis according to the data identifying the subset of and the data identifying the order of precedence for the data object attributes of the data object attribute criterion; and
wherein:
the first pole of the first axis and the first pole of the second axis are identified in a precedence configuration setting consumed by the user interface; and
the selected data object attribute criterion and the precedence configuration setting are stored in at least one data structure independent of data of the plurality of data objects.

10. The system of claim 9, wherein the remote location is a database.

11. The system of claim 10, wherein the database is a database of products available for purchase.

12. The system of claim 9, wherein the data object attribute configuration settings further include a:
a filtering rule associated with at least one of the at least two data object attributes, with application of the filtering rule removing data objects from view within the user interface based on a value of the at least one of the at least two data object attributes is excluded by the filtering rule.

* * * * *